United States Patent
Wilding et al.

(10) Patent No.: US 9,272,447 B2
(45) Date of Patent: Mar. 1, 2016

(54) POWDER APPLICATION DEVICE AND METHOD FOR PRODUCING THERMOPLASTIC MOLDABLE SEMI-PLASTIC FINISHED GOODS

(75) Inventors: Emil Wilding, Birkenheide (DE); Michael Deilecke, Jockgrim (DE); Antonio Puma, Speyer (DE); Thorsten Katzenberger, Altrip (DE); Joerg Wottawa, Boehl-Iggelheim (DE)

(73) Assignee: Rhenoflex GmbH, Ludwigshafen (DE)

( * ) Notice: Subject to any disclaimer, the term of this patent is extended or adjusted under 35 U.S.C. 154(b) by 315 days.

(21) Appl. No.: 13/883,168

(22) PCT Filed: Oct. 25, 2011

(86) PCT No.: PCT/EP2011/068660
§ 371 (c)(1),
(2), (4) Date: Jun. 18, 2013

(87) PCT Pub. No.: WO2012/059367
PCT Pub. Date: May 10, 2012

(65) Prior Publication Data
US 2013/0270733 A1    Oct. 17, 2013

(30) Foreign Application Priority Data
Nov. 2, 2010    (DE) .......................... 10 2010 050 025

(51) Int. Cl.
*B29C 31/02*    (2006.01)
*B29D 35/12*    (2010.01)
(Continued)

(52) U.S. Cl.
CPC ................ *B29C 41/00* (2013.01); *B29C 31/02* (2013.01); *B29C 31/047* (2013.01);
(Continued)

(58) Field of Classification Search
None
See application file for complete search history.

(56) References Cited

U.S. PATENT DOCUMENTS 3,076,229 A    2/1963    Arpajian
4,557,402 A *  12/1985   Morse ........................... 222/230
(Continued)

FOREIGN PATENT DOCUMENTS

DE    26 21 195 A1    11/1977
DE    33 47 237 A1    7/1984
(Continued)

OTHER PUBLICATIONS

International Preliminary Report on Patentability issued in PCT/EP2011/068660, mailed May 16, 2013 and English Translation.
(Continued)

*Primary Examiner* — Mary F Theisen
(74) *Attorney, Agent, or Firm* — Venable LLP; Keith G. Haddaway; Annette K. Kwok

(57) ABSTRACT

There is proposed a powder application device P for producing blanks of thermoplastically deformable semifinished products for use as reinforcement elements, starting from a powder mixture containing a meltable plastics powder, comprising a downwardly open powder container B and a perforated stencil L, arranged beneath the latter and spaced apart therefrom, having one or more hole cutouts, said device being characterized in that the powder container B is rigidly connected to the perforated stencil L and is vertically lowerable as far as an auxiliary support or a distance of at most 5 mm therefrom, and is closable at its lower end by means of a horizontal closing plate S having a thickness slightly less than the distance between the powder container B and the perforated stencil L, wherein the closing plate S is movable in a horizontal plane such that it alternately closes and reopens the lower end of the powder container B.

9 Claims, 2 Drawing Sheets

Figure 1:
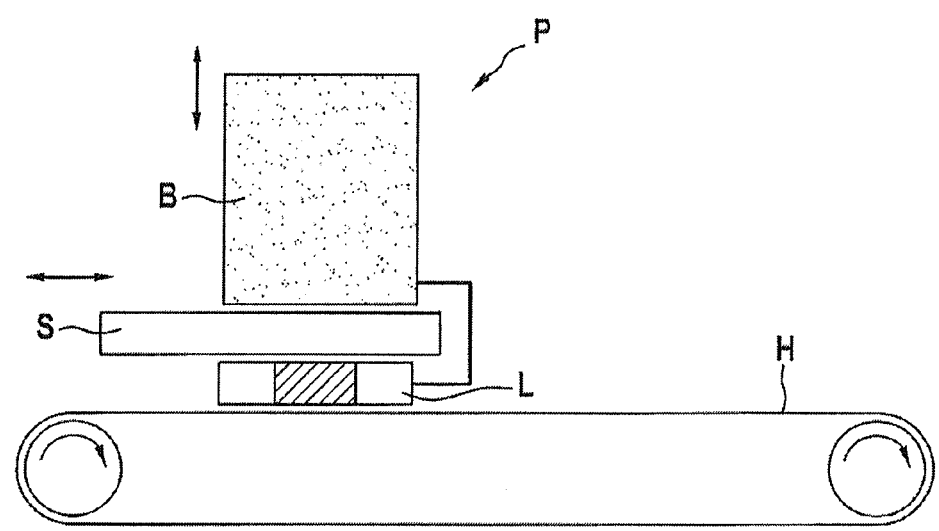

(51) Int. Cl.
  *B29C 41/00* (2006.01)
  *B29C 31/04* (2006.01)
  *B29C 31/06* (2006.01)
  *B29C 41/36* (2006.01)
  *B29C 43/34* (2006.01)
  *B29C 67/04* (2006.01)
  *B29C 67/08* (2006.01)
  *B29C 43/00* (2006.01)
  *B29K 105/00* (2006.01)
  *B29L 31/50* (2006.01)

(52) U.S. Cl.
  CPC .............. *B29C 31/066* (2013.01); *B29C 41/36* (2013.01); *B29C 43/34* (2013.01); *B29C 67/04* (2013.01); *B29C 67/08* (2013.01); *B29D 35/12* (2013.01); *B29D 35/122* (2013.01); *B29C 43/006* (2013.01); *B29K 2105/251* (2013.01); *B29K 2105/256* (2013.01); *B29L 2031/50* (2013.01)

(56) References Cited

U.S. PATENT DOCUMENTS 4,592,798 A * 6/1986 Simmonds et al. ........... 156/578
4,793,882 A   12/1988 Brehmer et al.
5,665,299 A * 9/1997 Uchida et al. ................. 264/510

FOREIGN PATENT DOCUMENTS

DE   35 39 573 A1   7/1984
GB   1 528 937 A    10/1978
GB   2 134 418 A    8/1984

OTHER PUBLICATIONS

International Search Report and Written Opinion issued in PCT/EP2011/068660, mailed Oct. 25, 2011.

* cited by examiner ial can be provided by impregnation of a textile sheet-like material with an aqueous plastics dispersion, said textile sheet-like material usually being provided, after drying, with a hot melt on one or both sides, or by extrusion, and can likewise be provided on its surface with a hot melt and also be sintered by the powder sintering method, in which melting plastics powders or powder mixtures containing such plastics powders are melted and sintered with or without a textile support.
POWDER APPLICATION DEVICE AND METHOD FOR PRODUCING THERMOPLASTIC MOLDABLE SEMI-PLASTIC FINISHED GOODS This application is a U.S. National Stage application of PCT/EP2011/068660, filed Oct. 25, 2011, which claims priority to Germany Application No. 10 2010 050 025.9 filed Nov. 2, 2010, the entire contents of which are hereby incorporated by reference.

The invention relates to a powder application device and to a method for producing thermoplastically deformable semifinished products for use as reinforcement elements.

The use of thermoplastic reinforcement materials for shaping and shape retention in the shoe, clothing, and bag-making industry has been known for a long time.

According to an earlier method, they are produced in webs and punched out to the desired shape for use as a shaping reinforcement material for example in the production of shoes, and are thinned (sharpened) peripherally to avoid the transition to the unreinforced "shoe upper material" standing out. The blanks are usually ironed onto the shoe upper by means of a hot ram and are thermoplastically deformable under the action of heat and are responsible for retaining the shape of the shoe after cooling. The thermoplastic web material can be provided by impregnation of a textile sheet-like material with an aqueous plastics dispersion, said textile sheet-like material usually being provided, after drying, with a hot melt on one or both sides, or by extrusion, and can likewise be provided on its surface with a hot melt and also be sintered by the powder sintering method, in which melting plastics powders or powder mixtures containing such plastics powders are melted and sintered with or without a textile support.

A particular disadvantage with the web method is the increased consumption of material on account of the waste produced during punching out, it being necessary for said waste to be disposed of or recycled. Furthermore, it is not possible to produce products with sharpened edges in a single operation.

DE 26 21 195 A1 discloses reinforcement materials, which are produced by the application, melting and sintering and also subsequent smoothing of pulverulent mixtures of plastics, fillers having a defined grain size distribution in the range of 50 to 500 µm and optionally further auxiliaries onto textile supports or auxiliary supports. By adjusting the grain size distribution of the pulverulent fillers to the grain size distribution of the plastics powder (100 to 500 µm), a powder mixture having an increased filler content can be made available, said powder mixture correspondingly having improved stiffness and also improved viscosity, such that penetration of the plastics melt to the textile support or auxiliary support is prevented.

DE 33 47 237 A1 describes the production of three-dimensional reinforcement parts, by application of meltable plastics powder by means of a screen-printing stencil in the form of the desired reinforcement part onto a receiving belt or an auxiliary support, subsequent melting and directly subsequent transfer onto a shoe upper by means of a special pressing device.

A particular disadvantage is the complicated guidance of the powder application device, which travels in a scraping movement over the screen-printing stencil and compacts the introduced powder at the edges, this not being desired.

This method, which is inadequate in many respects, is improved or replaced by the invention described in DE 35 39 573 B.

Here, instead of the screen-printing method, which is naturally limited by the screen meshes and the maximum powder grain sizes and produces an irregular powder application on account of the screen threads, the use of a stencil having one or more hole cutouts (perforated stencil) in the form of the desired reinforcement material is proposed for powder application.

The perforated stencil is mounted directly above a receiving belt (auxiliary support) and transversely to the running direction thereof, and is also mounted so as to be lowerable onto said receiving belt.

It is dimensioned such that a doctor box which is guided thereon and is filled with a thermoplastic powder mixture travels alternately from a left-hand "parked position" to a right-hand "parked position" in the position of the perforated stencil in which it is lowered onto the receiving belt: this type of movement can also be known as pulled or pushed. In this case, the hole cutouts in the perforated stencil are each filled with the thermoplastic powder mixture.

After the introduction of powder, the perforated stencil is lifted together with the doctor box in the parked position, until the applied powder has been moved by way of the receiving belt into the next holding position, the heating zone, and in order then to be lowered again for the next application operation.

The method has the disadvantage that the doctor box wipes or scrapes over the cutouts in the perforated stencil, i.e. the thermoplastic powder mixture is filled into the hole cutouts from a moved powder column and is removed at the edges of the hole cutouts. This has the disadvantage that the amount of powder applied is not exactly controllable and so irregular application of powder on one side can occur and in particular also by way of the scraping movement (closing movement), the edges of the blanks formed from the thermoplastic powder mixture in the hole cutouts in the stencil are compacted. However, what are desired in practice, on the contrary, are reinforcement elements having thinned or sharpened edges. Furthermore, the powder application device is complicated because it has to be guided in a complex movement in the horizontal and in the vertical direction.

Accordingly, it was the object of the invention to provide an improved powder application device and an improved method for producing thermoplastically deformable semifinished products, wherein the device is intended to be producible in a technically simple manner, executes in particular a simple, unidimensional translation movement, and by way of which it is possible to obtain improved thermoplastically deformable semifinished products which can be adapted easily to the changing requirements of the market with respect to shape, physical properties, in particular stiffness, and chemical properties.

The object is achieved by a powder application device for producing blanks of thermoplastically deformable semifinished products for use as reinforcement elements, starting from a powder mixture containing a meltable plastics powder, comprising a downwardly open powder container B and a perforated stencil L, arranged beneath the latter and spaced apart therefrom, having one or more hole cutouts, said device being characterized in that the powder container B is rigidly connected to the perforated stencil L and is vertically lowerable as far as an auxiliary support or a distance of at most 5 mm therefrom, and is closable at its lower end by means of a horizontal closing plate S having a thickness slightly less than the distance between the powder container B and the perforated stencil L, wherein the closing plate S is movable in a horizontal plane such that it alternately closes and reopens the powder container B at the lower end thereof.

According to the invention, there is thus provided a powder application device which comprises a powder container P and a perforated stencil L rigidly connected thereto. The powder application device B, comprising the powder container P and the perforated stencil L rigidly connected thereto, is configured such that it carries out a simple, vertical translation movement in order as a result to be lowerable onto the auxiliary support, to which the powder mixture is applied, or as far as a short distance therefrom, generally at most 5 mm.

The perforated stencil L is arranged beneath the powder container B and spaced apart therefrom, i.e. at a distance from the powder container B.

There are in principle no restrictions with regard to the geometry and the capacity of the powder container B; what is essential is that it has an opening at its lower end, said opening being large enough to allow enough material of the meltable plastics powder-containing powder mixture to trickle into the hole cutouts in the perforated stencil L, in order that said hole cutouts are filled in an economically reasonable time. Thus, the powder container B must have a sufficient volume for a powder column to be available which has sufficient static pressure in order to fill the hole cutouts in an economically acceptable time.

The geometry of the powder container B can for example be cylindrical and narrow downwardly.

In a further preferred embodiment, the powder container B can be formed in a parallelepipedal manner and likewise narrow in a funnel-like manner preferably in its lower region.

The perforated stencil L which is arranged under the closing plate S in sliding contact therewith and which is rigidly connected to the powder container B is in particular a planar plate, from which the one or more hole cutouts have been cut out. The perforated stencil L is thus a negative stencil which comprises hole cutouts which correspond to the geometric shape of the semifinished products to be produced and which are connected together by the crosspieces. The perforated stencil L has to be so stable (stiff) that it withstands the pressure of the powder column without deforming.

For this purpose, in particular plastics, for example PVC, or else board, and for larger runs also metal stencils, can be used.

The perforated stencil L can comprise a basic or universal stencil, having larger hole cutouts, which is suitable for a large number of different geometric shapes of the semifinished products to be produced, which is used as a supporting device for one or more special stencils to be arranged on top of it and having smaller hole cutouts than the universal stencil, and which are adapted specifically to the semifinished product desired.

The desired number of hole cutouts can be positioned in a space-saving manner on the perforated stencil, but care should be taken to ensure that the remaining material (the crosspieces) is still sufficiently stable to withstand the powder column without deforming. Care should also be taken to ensure that the hole cutouts are spaced sufficiently far apart in order that the blanks which are formed by the plastics powder being introduced into the individual cutouts are not joined together and in particular do not fuse together during subsequent processing under application of heat.

The perforated stencil L has in particular a thickness in the range of 0.2 to 2.0 mm, particularly preferably in the range of 0.5 to 0.8 mm.

The vertical travel of the powder container rigidly connected to the perforated stencil L is advantageously as low as possible and is preferably at most 5 mm.

The powder container B is closable at its lower open end by way of a closing plate S which is arranged so as to be movable in a horizontal plane between the lower end of the powder container B and the perforated stencil L and which alternately closes the lower end of the powder container B in a powder-tight manner and reopens it. The closing plate S should be selected to be as thin as possible in order largely to avoid the undesired scraping effect during cutting-off of the powder column, but as thick as necessary in order to ensure sufficient stiffness thereof. To this end use is preferably made of stainless steel or a carbon fiber reinforced plastics material.

A thickness of the closing plate S in the range between 0.5 and 5 mm, in particular a thickness of around 4 mm, has proven successful.

The closing plate S can preferably be formed with an upwardly beveled cutting edge, as a result of which the undesired scraping action and the associated undesired compaction of the plastics powder in subregions of the blanks is further reduced.

In a particularly preferred embodiment, the powder application device has two or more powder containers B, each rigidly connected to a perforated stencil L, which are each closable at the lower end thereof by way of a horizontal closing plate S which is movable in a horizontal plane.

As a result of two or more powder application devices P preferably being arranged in succession, a number of improvements can be achieved and powder mixtures having different properties, in particular different hardnesses or grain sizes, can be used, and as a result the structure of the thermoplastically deformable semifinished products that are produced can be set. If the different powders are applied "on top of one another" by way of differently sized cutouts in the perforated stencil, the different properties can be combined. In particular, the stiffness thereof can be set in a targeted manner, for example semifinished products which are harder in the middle and softer at the edge can be provided.

This preferred embodiment of a powder application device furthermore has the advantage that the same powder mixture can be introduced into all powder containers B, as a result of which the filling of the hole cutouts can be carried out much more quickly, and it is furthermore ensured that this takes place with as little movement as possible of the powder column, in order that the still fragile blanks made of the plastics powder or made of the powder mixture containing a meltable plastics powder do not lose their shape.

Furthermore, it is also possible with this embodiment of the powder application device, to use in each case different perforated stencils, such that the shape of the semifinished products that are obtained can be set in a targeted manner.

Another subject of the invention is a method for producing thermoplastically deformable semifinished products for use as reinforcement elements starting from a powder mixture containing a meltable plastics powder, which is applied by means of a powder application device P comprising a downwardly open powder container B and a perforated stencil L, arranged beneath the latter and spaced apart therefrom, having one or more hole cutouts, with blanks being formed on a horizontal auxiliary support, said blanks being melted by application of heat and being sintered, producing the thermoplastically deformable semifinished products, said method being characterized in that the blanks are obtained in that the powder container B, which is rigidly connected to the perforated stencil L and is closed at its lower end by means of a horizontal closing plate S having a thickness slightly less than the distance between the powder container B and the perforated stencil L, is lowered as far as the horizontal auxiliary support H or a distance therefrom corresponding to the desired thickness of the reinforcement material, whereupon the horizontal closing plate S is moved in a plane substantially parallel to the horizontal auxiliary support and opens the lower end of the powder container B such that the powder mixture trickles into and fills the hole cutouts in the perforated stencil L, whereupon the horizontal closing plate S is moved back again into the position in which it closes the powder container B at the lower end thereof.

The powder application device according to the invention and the method according to the invention are not restricted with regard to the usable powder mixture containing a meltable plastics powder. For example a mixture of meltable plastics powder and pulverulent filler corresponding to the details in DE 26 21 195 A1 can be used as powder mixture, wherein the pulverulent filler has a grain size distribution of 50 to 600 μm in particular 100 to 400 μm, which is comparable to the grain size distribution of the plastics powder. However, the plastics powder can according to the invention also be used without filler or in a mixture with other plastics particles. The "other" plastics particles used in the last-mentioned embodiment are polymers which melt in a higher temperature range and thus in the undissolved state assume the function of a filler. Suitable mixtures are for example mixtures of high pressure polyethylene and low pressure polyethylene and those made of an ethylene-vinyl acetate copolymer and a polyethylene. Polycaprolactone and ionomer resins are also mentioned at this point as suitable plastics materials having a low melting point. It is also of course possible to use wood flour, cork flour, chalk, talc, siliceous earth and other organic and inorganic substances as fillers.

The powder mixture containing a meltable plastics powder is applied to a horizontal auxiliary support, which may be in particular a nonstick, preferably Teflon-coated fabric belt and which transports onward the blanks which have been obtained after application of the powder mixture into the hole cutouts, in order that said blanks can be melted and application of heat and can be sintered so as to give the shape predefined by the perforated stencil.

Figure 2:
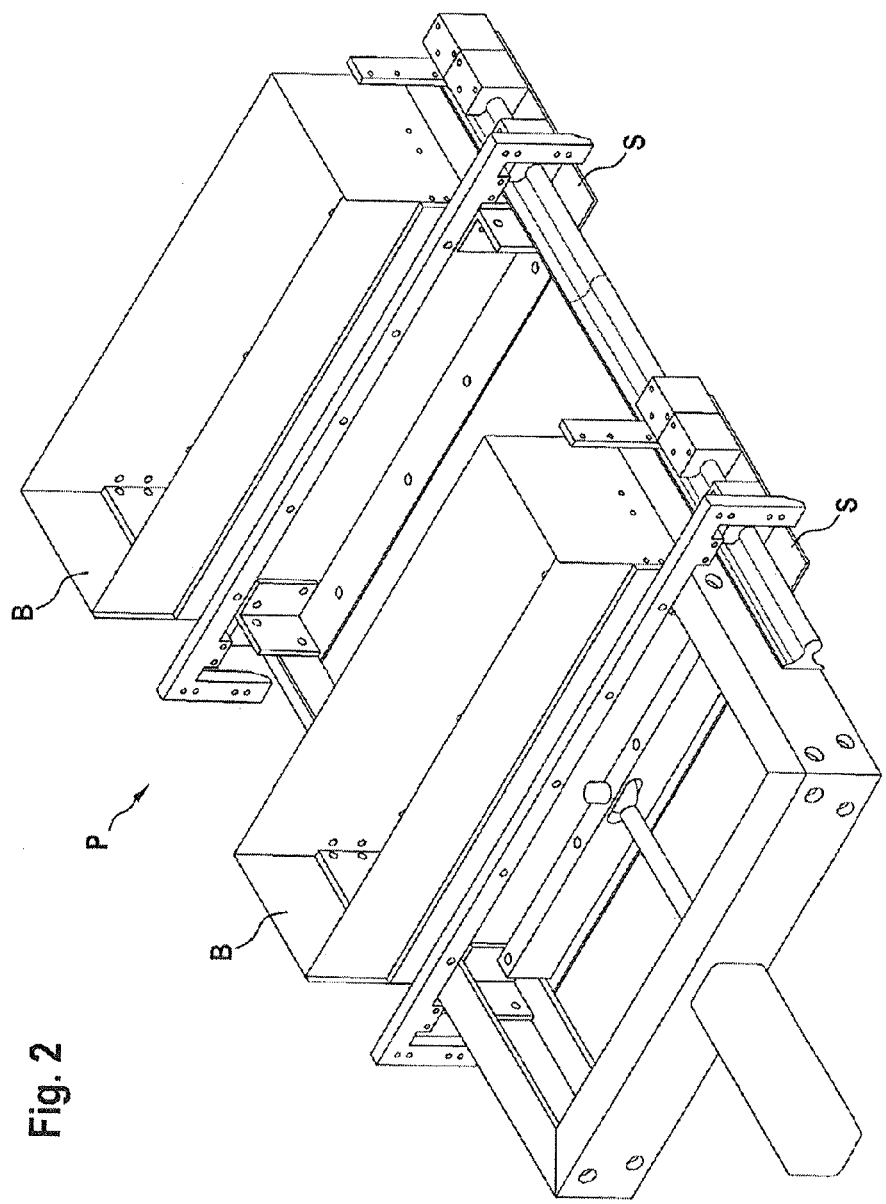

The invention is explained in more detail in the following text with reference to the figures, in which, specifically:

FIG. 1 shows a schematic illustration of a preferred embodiment of a powder application device P according to the invention and FIG. 2 shows a further schematic illustration of a powder application device P according to the invention having two powder containers B and two closing plates S.

The powder container B is arranged in a manner spaced apart from the perforated stencil L and is rigidly connected to the latter. The powder container B and the perforated stencil L are movable in the vertical direction. A closing plate S is horizontally movable in the intermediate space between the powder container B and the perforated stencil L and an auxiliary support H, which may for example be a circulating fabric belt, is arranged beneath the powder application device P.

The schematic illustration in FIG. 2 shows a further preferred embodiment of a powder application device P according to the invention having two parallelepipedal powder containers B which are each closable at their lower end by means of a closing plate S.

The perforated stencils L are not illustrated in the figure.

The invention claimed is:

1. A powder application device P for producing blanks of thermoplastically deformable semifinished products for use as reinforcement elements, starting from a meltable plastics powder or a powder mixture containing a meltable plastics powder, comprising a downwardly open powder container B and a perforated stencil L, arranged beneath the latter and spaced apart therefrom, having one or more hole cutouts, characterized in that the powder container B is rigidly connected to the perforated stencil L and is vertically lowerable as far as an auxiliary support H or a distance of at most 5 mm therefrom, and is closable at its lower end by means of a horizontal closing plate S, which is positioned between the powder container B and the perforated stencil L, having a thickness slightly less than the distance between the powder container B and the perforated stencil L, wherein the closing plate S is movable in a horizontal plane such that it alternately closes and reopens the lower end of the powder container B.

2. The powder application device P as claimed in claim 1, characterized in that the perforated stencil L has a thickness in the range of 0.2 to 2.0 mm.

3. The powder application device P as claimed in claim 1, characterized in that the closing plate S has a thickness in the range between 0.5 and 2 mm.

4. The powder application device P as claimed in claim 1, characterized in that the closing plate S has an upwardly beveled cutting edge.

5. A powder application device P for producing blanks of thermoplastically deformable semifinished products for use as reinforcement elements, starting from a meltable elastics powder or a powder mixture containing a meltable plastics powder, comprising a downwardly open powder container B and a perforated stencil L, arranged beneath the latter and spaced apart therefrom, having one or more hole cutouts, characterized in that the powder container B is rigidly connected to the perforated stencil L and has a vertical travel of at most 10 mm, and is closable at its lower end by means of a horizontal closing plate S, which is positioned between the powder container B and the perforated stencil L, having a thickness slightly less than the distance between the powder container B and the perforated stencil L, wherein the closing plate S is movable in a horizontal plane such that it alternately closes and reopens the lower end of the powder container B.

6. The powder application device P as claimed in claim 1, characterized in that said powder application device P comprises two or more powder containers B, each rigidly connected to a perforated stencil L, having in each case one horizontal closing plate S which is movable in a horizontal plane and which alternately closes and reopens the lower end of the powder container B.

7. A method for producing thermoplastically deformable semifinished products for use as reinforcement elements providing a meltable plastics powder or a powder mixture containing a meltable plastics powder, applying the powder with a powder application device P comprising a downwardly open powder container B and a perforated stencil L, arranged beneath the latter and spaced apart therefrom, having one or more hole cutouts, with blanks being formed on a horizontal auxiliary support, melting and sintering said blanks by application of heat, thereby producing the thermoplastically deformable semifinished products, wherein the blanks are obtained by lowering the powder container B, which is rigidly connected to the perforated stencil L and is closed at its lower end by means of a horizontal closing plate S, which is positioned between the powder container B and the perforated stencil L, having a thickness slightly less than the distance between the powder container B and the perforated stencil L, as far as the horizontal auxiliary support or a distance therefrom corresponding to the desired thickness of the reinforcement material, whereupon moving the horizontal closing plate S in a plane substantially parallel to the horizontal auxiliary support to open the lower end of the powder container B such that the powder mixture trickles into and fills the hole cutouts in the perforated stencil L, whereupon moving the horizontal closing plate S back into the position in which it closes the powder container B at the lower end thereof.

8. The powder application device P as claimed in claim 1, characterized in that the perforated stencil L has a thickness in the range of 0.5 to 0 8 mm.

9. The powder application device P as claimed in claim 1, characterized in that the closing plate S has a thickness of about 4 mm.

* * * * *